United States Patent
Graham

[15] 3,649,035
[45] Mar. 14, 1972

[54] A SELAING MEANS FOR A BALL VALVE
[72] Inventor: William J. Graham, Metairie, La.
[73] Assignee: Texaco Inc., New York, N.Y.
[22] Filed: Dec. 30, 1969
[21] Appl. No.: 1,913

Related U.S. Application Data
[62] Division of Ser. No. 739,469, June 24, 1968, Pat. No. 3,549,122.

[52] U.S. Cl. .........................................................277/231
[51] Int. Cl. .......................................F16j 15/00, F16r 5/20
[58] Field of Search ..................277/231, 234; 251/174, 175, 251/315, 172

[56] References Cited
UNITED STATES PATENTS
3,397,861  8/1968  Scaramucci ..........................277/231
3,408,038  10/1968  Scaramucci ..........................277/231

FOREIGN PATENTS OR APPLICATIONS
380,078  4/1940  Italy........................................277/234
522,024  6/1940  Great Britain Primary Examiner—Robert J. Smith
Attorney—K. E. Kavanagh and Thomas H. Whaley

[57] ABSTRACT

A ball valve wherein a rotatable ball controls the rate of fluid flow therethrough and is engaged by a sealing means which includes annular members of different materials and rigidity adjacently spaced to each other and engaging the ball.

2 Claims, 4 Drawing Figures

Patented March 14, 1972 3,649,035
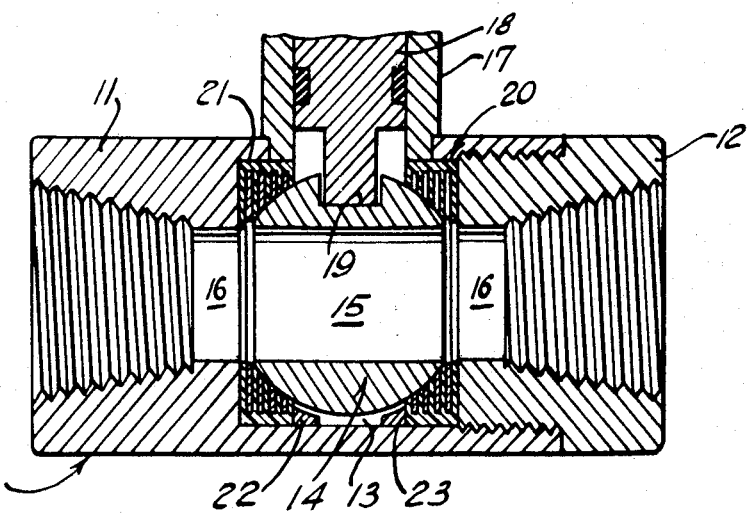
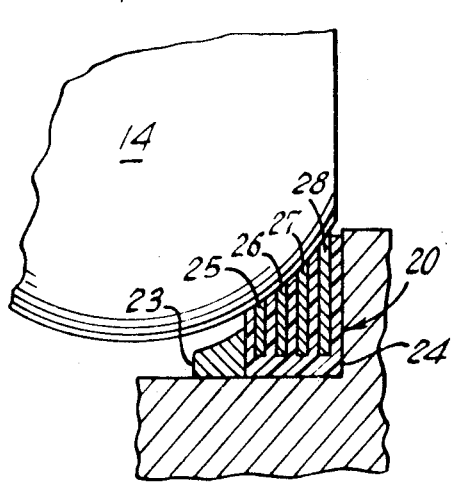
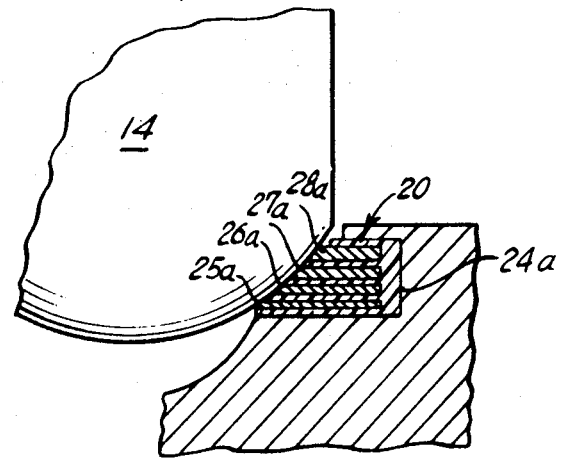
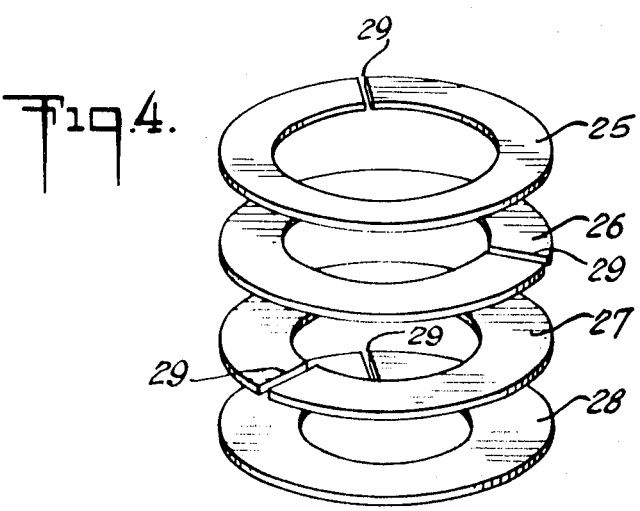

SEALING MEANS FOR A BALL VALVE

This application is a divison of Ser. No. 739,469 filed June 24, 1968 now U.S. Pat. No. 3,549,122.

BACKGROUND OF THE INVENTION

This invention pertains generally to a ball valve and more specifically to a sealing means therefor.

Ball valves of this general type are frequently utilized in fluid systems operating at high pressures. Effective sealing must be provided during the high pressure operations, with the seal also remaining effective during shock loads and when the system pressure is reduced. This is particularly true if the fluid in the system is of a corrosive nature and leakage through the valve would prove hazardous. Various sealing means exist in the prior art, and more or less generally satisfy the aforementioned requirements. However, most prior art seals that satisfy the sealing requirements under the different operating conditions, require high torques to rotate the valve. This higher operative torque adds to the cost of the valve since a larger operator is necessary to provide the higher torque. To eliminate this problem, a novel sealing means has been developed to reduce the friction between the sealing means and the rotatable ball.

SUMMARY OF THE INVENTION

The invention in general provides a sealing means engaging a ball having a fluid conduit therethrough, and more particularly to a sealing means wherein adjacently spaced members are of different materials to provide effective sealing and reduce the amount of friction between the ball and the sealing means.

The principal advantage made possible by the use of this invention over those disclosed in the prior art is that effective sealing is accomplished without the concomitant high torque necessary to operate the valve. When the prior art valve is in the closed position and the upstream pressure is high, the ball is forced toward the opposing opening in the valve body and becomes deformed therein. This deformation of the ball adds to the already high friction between the normally metal ball and the normally metal sealing means, and further increases the amount of torque required to operate the valve. The sealing means provided herein practically eliminates the deformation of the spherical plug or ball, since the seal allows expansion and compression therein. Further, the friction normally required to operate the valve is reduced by having alternate adjacently spaced members of a low friction type material.

Accordingly, it is an overall object of this invention to provide a ball valve with an effective sealing means therefor.

Another object of this invention is to provide a ball valve capable of being operated with a low torque.

These and other objects, advantages and features of the invention will become more apparent from the following description taken in conjunction with the accompanying drawing.

BRIEF DESCRIPTION OF THE DRAWING

FIG. 1 is a cross section of a ball valve having a sealing means disposed therein.

FIGS. 2 and 3 depict an enlarged fragmentary view of the sealing means.

FIG. 4 is an isometric view of the disklike annular members.

DESCRIPTION OF THE PREFERRED EMBODIMENT

With reference to the drawings, the ball valve, indicated generally at 10, comprises a two piece casing, 11 and 12, secured together and defining therebetween a valve chamber 13. A ball 14, with a fluid conduit 15 therethrough, is rotatably alignable with the fluid conduit 16 in the main body 10, and is disposed in the valve chamber 13. A bonnet 17, is secured to the casing 11, and provides a support member for the valve stem 18. The ball 14 contains a recess 19 into which the stem 18 is engaged to provide a means for rotating the ball and control the rate of fluid flow through the valve 10. The ball 14 is seated between two sealing members 20 and 21, which are of identical construction and disposed to face each other. A retaining member 22 and 23, is spaced adjacent each and sealing member 20 and and 21, and provides a means for positioning the sealing members in the valve chamber 13.

Referring to FIG. 2, the sealing member 20 is positioned in orthogonal relation to the fluid conduit 15 in the ball 14. The sealing member 20 comprises an annular member 24, containing a plurality of annular grooves therein. Disposed in each of these annular grooves are annular disks indicated at 25, 26, 27, and 28. Alternatively, the sealing member 20 may comprise a plurality of annular disks of different materials adjacently spaced. The annular member 24 is preferably made of a tetrafluoroethylene resin, such as the plastic material sold by DuPont Company under the trademark Teflon. This material maintains numerous advantages, including self lubrication and resistance to corrosives, but materials other than this preferred material may be employed. The annular disks 25, 26, 27, and 28 are preferably of a metallic material being more rigid than that of the annular member 24. The annular disks 25, 26, 27, and 28 are shown in detail in FIG. 4 wherein it is indicated that the disk may be split at 29 to allow expansion and compression thereof when the load of the ball 14 is imposed thereon. The annular disks 25, 26, 27, and 28 are arranged with the split portion of each member spaced 120° apart from the split portion on the adjacent member, although other spacings may be utilized. Advantages may also be found by interchanging the materials of the annular member 24 and that of the annular disks 25, 26, 27, and 28, i.e., having the annular member 24 fabricated from a metallic material whereas the annular disks 25, 26, 27, and 28 may alternatively be fabricated from a tetrafluoroethylene resin.

Preferably, the inner diameters of the annular disks 25, 26, 27, and 28, and the annular member 24, are contoured to the shape of the ball 14. It may also be found desirable to have the annular disks 25, 26, 27, and 28 extend slightly beyond that of the annular member 24 and thereby provide a means for sealing under low pressure. As the upstream fluid pressure is increased, the annular disks compress and deform into the slots they are embedded in, thereby allowing the less rigid material, i.e., the tetrafluoroethylene resin, to also engage the ball 14. In this manner, at least 50 percent of the contact area between the sealing member 20 and the ball 14 is that of the low friction material. The ball 14 may then be rotated by means of the stem 18 with a lower torque, since the friction between the two members has been reduced greatly. Furthermore, deformation of the ball is reduced also since the initial deformation occurs in the annular disks because of the expansion/compression slots 29 contained therein.

Referring to FIG. 3, an alternate construction of the sealing member is depicted. The sealing member 20 comprises a plurality of tubular rings 25a, 26a, 27a, and 28a having the walls thereof parallel to the fluid conduit and embedded in the annular sealing member 24a. The sealing member is again positioned in orthogonal relation to the fluid conduit 16 through the main body of the valve 10. Again expansion slots may be provided in the tubular rings 25a, 26a, 27a, and 28a to allow for compressibility thereof as the upstream pressure is increased.

Other modifications and variations of the invention as hereinbefore set forth may be made without departing from the spirit and scope thereof, and therefore only such limitations should be imposed as are indicated in the appended claims.

I claim:

1. Sealing means for a ball valve comprising an annular tetrafluoroethylene member having a plurality of annular grooves on the sealing surface thereof, and a plurality of annular metallic disks embedded in said plurality of annular grooves, said annular disks being of a material different from that of said annular member and extending beyond said sealing surface of said annular member, each disk being split to allow for expansion and compression thereof, the split portions of adjacent disks being spaced 120° apart from each other.

2. A sealing means as defined in claim 1 wherein said sealing surface of said annular member and the exposed surfaces of said annular disks being contoured to the shape of the member engaged therewith.

* * * * *